(12) United States Patent
Meredith et al.

(10) Patent No.: US 9,548,996 B2
(45) Date of Patent: Jan. 17, 2017

(54) HYBRID ENGINE FOR GENERATING A RECOMMENDED SECURITY TIER

(71) Applicant: FMR LLC, Boston, MA (US)

(72) Inventors: Wesley Meredith, Boston, MA (US); Rajee Jones, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/706,819

(22) Filed: May 7, 2015

(65) Prior Publication Data

US 2016/0330243 A1 Nov. 10, 2016

(51) Int. Cl.
*G06F 17/00* (2006.01)
*H04L 29/06* (2006.01)

(52) U.S. Cl.
CPC ............... *H04L 63/20* (2013.01); *H04L 63/08* (2013.01); *H04L 63/102* (2013.01)

(58) Field of Classification Search
CPC .......... H04L 63/20; H04L 63/10; H04L 63/08; H04L 63/1416; H04L 63/1433
USPC ........................................................... 726/1
See application file for complete search history.

(56) References Cited

U.S. PATENT DOCUMENTS

| 2009/0083840 | A1* | 3/2009 | Jensen | G06N 5/04 726/6 |
| 2009/0178019 | A1* | 7/2009 | Bahrs | G06F 21/62 717/104 |
| 2012/0317288 | A1* | 12/2012 | Campana | G06F 17/30017 709/225 |

* cited by examiner

*Primary Examiner* — Kambiz Zand
*Assistant Examiner* — Stephen Sanders
(74) *Attorney, Agent, or Firm* — Proskauer Rose LLP (57) ABSTRACT

A computer-implemented method, including receiving, by one or more computer systems, customer characteristic information for a user; applying, by the one or more computer systems, one or more recommendation rules to the customer characteristic information to determine a security tier; comparing, by the one or more computer systems, the customer characteristic information to one or more other users with a threshold level of similarity to the user for which the customer characteristic information is received; identifying, by the one or more computer systems, a security tier assigned to one of the one or more other users; and generating information indicative of a recommended security tier, based on the identified security tier and the determined security tier.

21 Claims, 5 Drawing Sheets

HYBRID ENGINE FOR GENERATING A RECOMMENDED SECURITY TIER

BACKGROUND

Generally, a security level represents an amount of authentication required to verify that a user is an authorized user.

SUMMARY

In an implementation, a computer-implemented method includes receiving, by one or more computer systems, customer characteristic information for a user; applying, by the one or more computer systems, one or more recommendation rules to the customer characteristic information to determine a security tier; comparing, by the one or more computer systems, the customer characteristic information to one or more other users with a threshold level of similarity to the user for which the customer characteristic information is received; identifying, by the one or more computer systems, a security tier assigned to one of the one or more other users; and generating information indicative of a recommended security tier, based on the identified security tier and the determined security tier.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The actions include accessing one or more customer matrixes, with a customer matrix comprising at least a portion of the other customer characteristic information for one or more of the other users; applying a classification algorithm to the one or more customer matrixes; and determining a classification for the user, with the classification comprising customer characteristics of one or more other users. The actions include when at least two other users are assigned to the classification as the user, averaging values of security tiers assigned to other users in the classification. The actions include averaging a value of the identified security tier and a value of the determined security tier, with the recommended security tier being the averaged values of the identified security tier and the determined security tier. The actions include applying by the one or more computer systems a first weight to the identified security tier and a second weight to the determined security tier; where averaging comprises averaging a weighted value of the identified security tier and a weighted value of the determined security tier. The security tier determined is a first recommended security tier, and wherein the method further comprises: for each type of customer characteristic included in the accessed customer characteristic information, accessing a mapping of one or more values for the type of customer characteristic to one or more security tiers; and determining, based on the mapping, a security tier for the type of customer characteristic; and determining, based on the security tiers for the types of customer characteristics included in the accessed customer characteristic information, the first recommended security tier. The actions include averaging values of the security tiers for the types of customer characteristics included in the accessed customer characteristic information to determine the first recommended security tier.

All or part of the foregoing may be implemented as a computer program product including instructions that are stored on one or more non-transitory machine-readable storage media and/or one or more computer-readable hardware storage devices that are a hard drive, a random access memory storage device, such as a dynamic random access memory, machine-readable hardware storage devices, and other types of non-transitory machine-readable storage devices, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DETAILED DESCRIPTION

A system consistent with this disclosure enables customers to choose their own level of security for an online account. This system includes a hybrid recommendation engine that uses both customer demographics and collaborative filtering to suggest which level of account security is appropriate for the customer.

Figure 1:
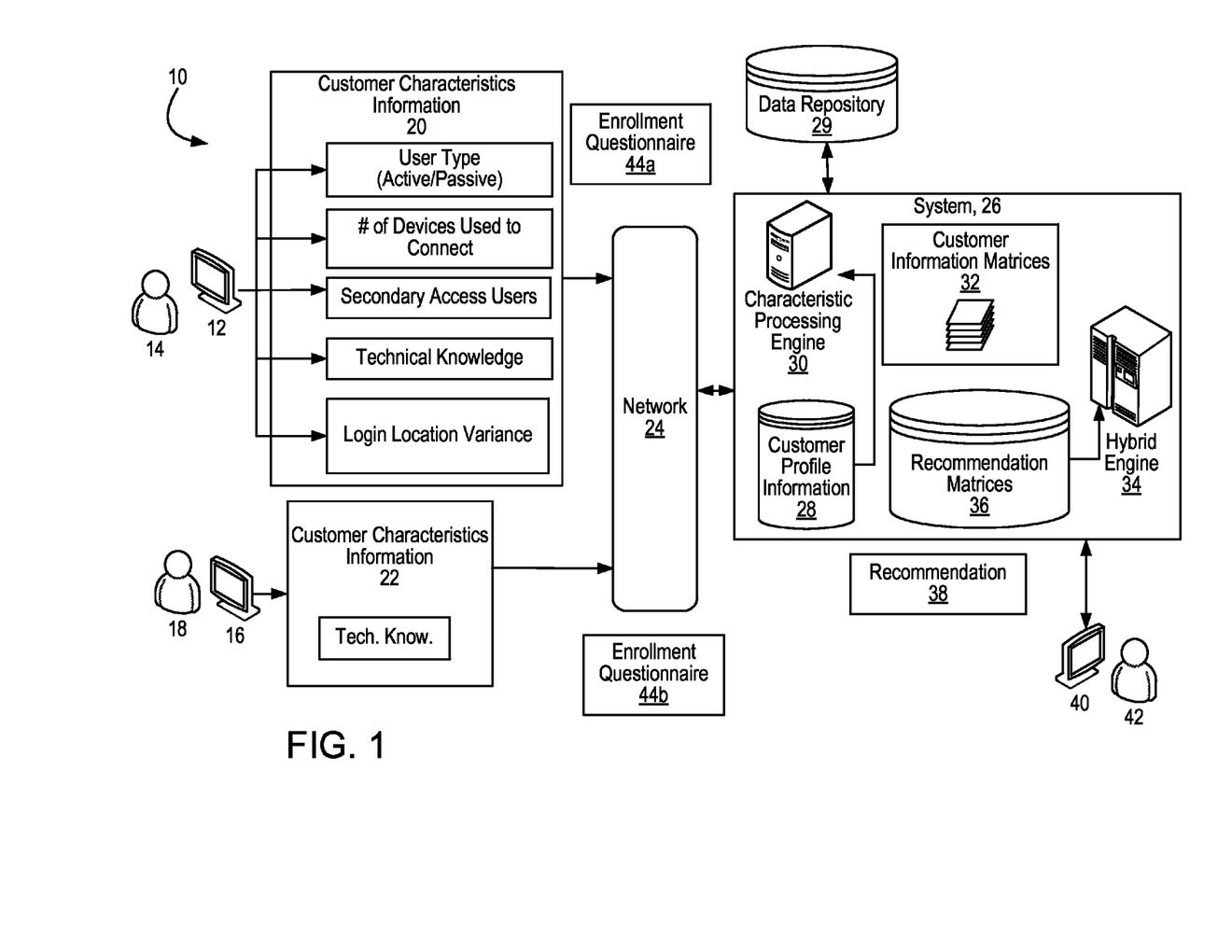
FIG. 1 is a diagram of a system for generating a recommendation for a security tier.

Referring to FIG. 1, networked environment 10 includes client devices 12, 16, network 24, data repository 28, and system 26 with hybrid recommendation engine 34 (hybrid engine 34). System 26 is an information security system (or implements an information security application) that recommends a security tier. To obtain information for use in generating a security tier (e.g., level), system 26 transmits enrollment questionnaire 44a to client device 12 of a new user 14 associated with client device 12. Generally, a new user includes a user without information (or with a limited amount of information) stored in a data repository. Enrollment questionnaire 44a prompts a user for various types of information, including, e.g., user type information, device information (e.g., number of devices being used to access an account), secondary user information, technical knowledge information, login location variance information and login frequency information, as shown in the below Table 1.

TABLE 1

1. How often do you plan on making purchases or transactions using your Brokerage account?
   a) Daily
   b) Weekly
   c) Monthly
   d) Quarterly
   e) Yearly
2. How many devices will you be using the access this account? Just provide a best guess if you're unsure.
   3
3. On a scale from 1 to 10, rate your level of technical expertise.
   9

TABLE 1-continued

4. How often do you plan on logging into your account?
   a) Daily
   b) Weekly
   c) Monthly
   d) Quarterly
   e) Yearly
5. How often do you anticipate you'll be logging into your account from a new location?
   a. Daily
   b. Weekly
   c. Monthly
   d. Quarterly
   e. Yearly
6. How often do you plan on making purchases or transactions using your Fidelity Brokerage account?
   a) Daily
   b) Weekly
   c) Monthly
   d) Quarterly
   e) Yearly
7. How many devices will you be using the access this account? Just provide a best guess if you're unsure.
   3
8. On a scale from 1 to 10, rate your level of technical expertise.
   9
9. How often do you plan on logging into your account?
   a) Daily
   b) Weekly
   c) Monthly
   d) Quarterly
   e) Yearly
10. How often do you anticipate you'll be logging into your account from a new location?
    a. Daily
    b. Weekly
    c. Monthly
    d. Quarterly
    e. Yearly As shown in the above Table 1, the enrollment questionnaire prompts a user for user type information, device information, secondary user information, technical knowledge information, login location variance information and login frequency information.

User type information specifies whether a user is an active user (who frequently interacts with a financial market) or a passive user (who infrequently interacts with a financial market). That is, this information generally specifies how often the customer interacts with the market. This includes buy or sell orders, as well as money transfers both into and out of an account. For existing customers, system 26 determines this information by analyzing a user's account history (e.g., based on a user profile retrieved from data repository 28). For new customers, system 26 determines this characteristic by analyzing responses to an online survey (e.g., enrollment questionnaire 44*a*) submitted by users when creating their account.

Device information specifies a number of devices a customer uses to access his/her account. Device information has a positive correlation with an account security level. The more devices a customer uses to access his/her account the more opportunities malicious hackers have to jeopardize the account's security. For existing customers, system 26 determines this characteristic by analyzing their login device history (e.g., based on profile and/or historical information retrieved from data repository 28). For new customers, system 26 determines this characteristic by analyzing responses to an online survey (e.g., enrollment questionnaire 44*a*) submitted by users when creating their account.

Secondary user information specifies whether an account permits secondary user access. If a secondary user is allowed to access the account, such as investment advisors or next of kin, the account is more susceptible to security breaches. Logins from the secondary user add inherent risk, which the account's security settings should account for. For existing customers, system 26 determines this characteristic by analyzing the account's profile (which is retrieved from a data repository). For new customers, system 26 identifies this characteristic from information the user submits during the account creation process.

Technical knowledge information specifies a user's level of technical knowledge. With an increase in information technology (IT) security knowledge comes a decrease in account compromising actions. Users who have a more in-depth level of technical knowledge are less likely to perform actions that jeopardize their account. This characteristic is weighted less than the others, as often more security conscious customers desire more security despite the fact that they are less likely to have their account breeched. System 26 determines this information based on user's answers to enrollment questionnaire 44*a* or 44*b*.

Variance of login locations specifies the number of distinct login locations used by a customer. This information is positively correlated with the level of account security. Customers who often login in new locations are exposing themselves to more risk, as there are an ever growing number of people who spy on their activities. This risk is increased further if the customer is accessing his/her account from certain areas of the globe. For existing customers, system 26 determines this characteristic by analyzing a login location history (which is retrieved from data repository 38). For new customers this, system 26 determines this characteristic based on user's answers to an online survey, e.g., enrollment questionnaire 44*a*.

Login frequency information specifies the frequency with which a user accesses an account. Customers who login frequently are statistically more likely to have their account compromised, and they open themselves up to an increased number of "black-hat" hackers, i.e., a hacker that hacks for maliciousness or for personal gain. For existing customers, system 26 determines this characteristic by analyzing login frequency history (as retrieved from data repository 28). For new customers, system 26 determines this characteristic through the use of the online survey, sent to the user when creating an account.

System 26 generates two versions 44*a*, 44*b* of enrollment questionnaire. Enrollment questionnaire 44*a* is a version for new users and includes questions that prompt the user to provide user type information, device information, secondary user information, technical knowledge information, login location variance information and login frequency information. Enrollment questionnaire 44*b* is another version for existing users and prompts the user for technical knowledge information, e.g., when this information is not already stored in data repository 28. In an example, enrollment questionnaire 44*b* includes a single question: "On a scale from 1 to 10, rate your level of technical expertise."

In response to transmitting enrollment questionnaire 44*a* to client device 12, system 26 receives from, client device 12, customer characteristic information 20, which includes user type information, device information, secondary user information, technical knowledge information, login location variance information and login frequency information (not shown) for user 14. System 26 stores this customer characteristic information 20 for user 14 in data repository 28, e.g., in association with an identifier for user 14 and/or as part of a user profile for user 14.

System 26 also transmits enrollment questionnaire 44*b* to client device 16, which is associated with user 18 (who is an existing user). In response to this transmission, system 26 receives, from client device 16, customer characteristic information 22 for user 18, which includes technical knowledge information for user 18. System 26 stores this technical knowledge information for user 18 in data repository 28, e.g., in association with an identifier for user 18 and/or as part of a user profile for user 18. System 26 retrieves, from data repository 26, other customer characteristic information for user 18 (or retrieves information that is analyzed by system 26 to determine the other types of customer characteristic information).

System 26 includes characteristic processing engine 30 for accessing and/or storing a customer profile (with customer characteristics information) from data repository 28. Customer characteristics 20, 22 are processed by characteristic processing engine 30 and stored in appropriate customer profiles in data repository 28.

System 26 also includes hybrid engine 34 that generates a recommended security tier for a user based on a rule-based recommendation and a collaborative filtering recommendation. Generally, a rule-based recommendation includes a recommended security tier, with the recommendation being based on execution of a series of rules against a user profile. Generally, a collaborative filtering recommendation for a user includes a recommended security tier that is based on security tiers for other, similar users.

The rule-based recommendation and the collaborative filtering recommendation are each associated with a value representing a security tier. A value of 4 represents security tier 4 (e.g., the most secure level). A value of 3 represents security tier 3 (e.g., a security tier with a decreased amount of security, relative to an amount of security represented by security tier 4). Security tier 3 also has an increased amount of security, relative to an amount of security represented by security tier 1. Security tier 1 is the least secure tier.

There are various types of security tiers. Generally, a security tier is information specifying an amount of verifying or authentication information that is required before a user is granted access to particular types of information or functionality. In a security level 1, a user is required to provide user name/password, e.g., before being granted to certain types of information, to an account and/or to certain functionality. In security level 2, a user is required to provide the information required at security level 1 and additional information. For example, at level 2, a user is required to provide a user name/password and an answer to a security question. In security level 3, a user is required to provide the information required at security levels 1 and 2, in addition to additional information that is specified to level 3. At security level 3, the user is required to provider user name/password, an answer to a security question, and information displayed on a security fob (or other information that is specific to security level 3). In general, a particular security level is the aggregate of all the prior security levels (e.g., the levels that are less secure than the particular security level) and additional requirements that are specific to that particular security level. A security level varies based on a type of organization implementing the security level. Hybrid engine 34 weights the rule-based recommendation and the collaborative filtering recommendation. The amount of each of these weights is user configurable. Hybrid engine 34 determines an average value of the weighted rule-based and collaborative filtering recommendations. This average value represents the final recommendation 38.

Characteristic processing engine 30 transmits to hybrid engine 34 customer characteristics information and customer information matrices. When hybrid engine 34 is generating a recommendation for a new customer, the transmitted customer characteristics information is information that is collected via enrollment questionnaire 44a (and stored in data repository 28). When hybrid engine 34 is generating a recommendation for a new customer, the transmitted customer characteristics information is information that is retrieved from a data repository and is collected via enrollment questionnaire 44b (and stored in data repository 28).

Customer information matrices 32 include information indicative of user profiles for users with already assigned security tiers and an assigned security tier for each of the user profiles. The types of information included in customer information matrices 32 include user type information, device information, secondary user information, technical knowledge information, login location variance information and login frequency information, as shown in the below Table 2.

TABLE 2

| User Type | Device | 2$^{nd}$ User | Tech. Know. | Login Var. | Login Freq. | Tier |
|---|---|---|---|---|---|---|
| Active | 3 | Yes | Intermediate | Never | Often | 3 |
| Passive | 1 | No | Novice | Often | Rarely | 2 |
| Moderate | 5 | Yes | Experienced | Regularly | Never | 3 |

As shown in the above Table 2, security tiers are provided for three different users with different customer characteristics. In an example, customer information matrices 32 include thousands of security tiers and customer characteristics for thousands of users.

Hybrid engine 34 receives the customer information matrices 32 and the customer characteristics information (for the user for whom the recommendation is being generated). Using this information, hybrid engine 34 performs collaborating filtering. Collaborative filtering uses the customer's similarities to other users to predict which object (in this case security tiers) is most appropriate. A user is associated (in the data repository) with various characteristics, attributes and/or qualities. Engine 34 determines a threshold level of similarity, e.g., a minimum number of matching characteristics, attributes and/or qualities among the users. Engine 34 determines that the threshold level of similarity requires that users have at least three matching, partially matching or otherwise corresponding characteristics, attributes and/or qualities (or values of the characteristics, attributes and/or qualities). By comparing the characteristics, attributes and/or qualities of the users, engine 34 determines which users have the threshold number of characteristics, attributes and/or qualities matching characteristics, attributes and/or qualities of other users.

In another example, engine 34 determines that users are required to have a threshold level of similarity (among each other) for particular or selected characteristics, attributes and/or qualities. In this example, engine 34 compares characteristics, attributes and/or qualities of the users to determine which users have the threshold level of similarity for the specified or selected characteristics, attributes and/or qualities.

System 26 begins with an empty data repository 28 of user characteristics and corresponding tier selections. As users join, system 26 updates data repository 28 with their information. Once a pre-defined (e.g., minimum) or threshold amount of users have enrolled, hybrid engine 34 implements collaborative filtering to recommend security tiers to users. System 26 removes from data repository 28 customer profile information for users which have had account compromises, to prevent their (failed) selections from influencing future recommendations.

Hybrid engine 34 implements collaborative filtering by comparing the characteristics of a user to other users with similar characteristics. To perform this comparison, hybrid engine 34 executes a classification algorithm, such as the K-Nearest-Neighbors (KNN) algorithm. Prior to execution, a system administrator or other user is provided with an option to specify a number (K) of similar customers to consider when providing the recommendation.

Hybrid engine 34 selects security tiers of a specified number (e.g., K) of most similar users. Hybrid engine 34 determines an average value of the selected tiers to generate the collaborative filtering recommendation. In a variation, there are multiple collaborative filtering recommendations. In this example, the selected tiers are collaborative filtering recommendations. As described in further detail below, hybrid engine 34 combines the collaborative filtering recommendation(s) with the rule-based recommendation to calculate the final customer recommendation.

Hybrid engine 34 also generates a rule-based recommendation, based on executing a series of rules. These rules are stored in data repository 36 and are stored as recommendation matrices. These rules map customer characteristics to security tiers. Using these rules, hybrid engine 34 generates a recommendation (e.g., the rule-based recommendation) based on an average of the tiers that are mapped to values of the customer's characteristics. The rules within hybrid engine 34 are configurable to provide a high level of customization, as shown in the below Table 3.

TABLE 3

```
User Type:
Passive         Moderate               Active
|---------------|----------------------|
Tier 1          Tier 2/3               Tier 4
Number of devices used:
1      2       3       4      5       6       7+
|------|-----|-----|-----|--------|-------|
Tier 1-|---Tier 2--|-----Tier 3--|-Tier 4-|
Permitted Secondary Access:
No                      Yes
|-----------------------|
Tier 1                  Tier 3
Level of Tech Knowledge
Novice      Intermediate        Experienced
|---------|-----------------|
Tier 3      Tier 2               Tier 4
Variance of Login Location
Never           Rarely  Often           Regularly
```

TABLE 3-continued

```
|-------------|---------|------------|
Tier 1        Tier 2    Tier3        Tier 4
Frequency of Online Login
Never         Rarely    Often        Regularly
|-------------|---------|------------|
Tier 1        Tier 2    Tier 3       Tier 4
```

As shown in the above Table 3, values for the various types of customer characteristic information are mapped to various tiers. For example, a rule for user type specifies that when a user is an inactive user, the user is assigned to tier 1. The rule also specifies that when the user is a moderate user that the user is assigned to tiers 2 or 3, which a user would configure to specify which one of tiers 2 and 3 is assigned to a moderate user. This rules also specifies that when a user is an active user the user is assigned to tier 4.

For some of the questions, system 26 formats the answers to correspond to the rule conditions. For example, the user type question of "1. How often do you plan on making purchases or transactions using your Fidelity Brokerage account?" has answers of "a) Daily, b) Weekly, c) Monthly, d) Quarterly, and e) Yearly." However, the rule pertaining user type quantifies users as passive, moderate and active and thus has rule conditions of passive user, moderate user and active users. System 26 accesses a mapping of answers to rule conditions. For the user type question, the mapping specifies that an answer of "daily" or "weekly" corresponds to an active user, an answer of "monthly" or "quarterly" corresponds to a moderate user, and an answer of "yearly" corresponds to a passive user. System 26 accesses other mappings for other questions with answers that need to be formatted to comport to rule conditions of appropriate rules. System 26 applies these mappings to the answers to the questions in an enrollment questionnaire to generate customer characteristic information, e.g., in a format that in accordance with the format of the rules.

Hybrid engine 34 receives customer characteristic information, as shown in the below Table 4.

TABLE 4

| User Type | Devices | $2^{nd}$ User? | Tech. Know. | Login Var. | Login Freq. |
|---|---|---|---|---|---|
| Active | 3 | Yes | Intermediate | Never | Often |

As shown in the above Table 4, the customer characteristic information specifies that the user is an active user, who uses three devices for account access, who permits secondary access, who has an intermediate amount of technical knowledge, who does not login from different locations and who logs in often. Hybrid engine 34 applies the rules shown in Table 3 to the customer characteristic information to determine a tier for each type of customer characteristic information, as shown in the below Table 5.

TABLE 5

| User Type | Tier | Devices | Tier | $2^{nd}$ User? | Tier | Tech. Know. | Tier | Login Var. | Tier | Login Freq. | Tier |
|---|---|---|---|---|---|---|---|---|---|---|---|
| Active | 4 | 3 | 2 | Yes | 3 | Intermediate | 2 | Never | 1 | Often | 3 |

As shown in the above Table 5, hybrid engine 34 assigns tiers to the user characteristics of user type, number of devices used information, permitted secondary access, level of technical knowledge, variance of login location, and frequency of online login, based on applying the rules to the user characteristic information. Based on these assigned tiers, hybrid engine 34 generates a rule-based recommendation, in accordance with the equation shown in the below Table 6.

TABLE 6

Rule-based recommendation = Avg {(Tier$_{1(User\ Characteristic\ 1)}$ + ⋯ + Tier$_{n(User\ Characteristic\ n)}$)}

As shown in the above Table 6, the rule-based recommendation is an average of the values of the tiers assigned to the user characteristics (e.g., User Characteristic 1+ . . . +User Characteristic n). For the tiers assigned to user characteristics shown in the above Table 5, hybrid engine 34 calculates an average value of 2.5 (e.g., the average of the tiers shown in Table 5). Based on this calculation, hybrid engine 34 determines that the rule-based recommendation is either tier 2 or tier 3, depending on whether hybrid engine 34 is configured to round up or to round down. In a variation, hybrid engine 34 determines the rule-based aggregation by applying one or more operations to the tiers assigned to the various user characteristics. These operations include aggregation operations. In a variation, hybrid engine 34 applies one or more weights to the values representing the tiers, e.g., that are used in computing the rule-based recommendation. When customer profile information in data repository 28 is less than the threshold amount required for collaborative filtering, system 26 only generates a rule-based recommendation.

Using the rule-based recommendation and the collaborative filtering recommendation(s), hybrid engine 34 computes a recommended tier, e.g., by averaging the rule-based recommendation and the collaborative filtering recommendation (s), by generating a ratio of the rule-based recommendation to the collaborative filtering recommendation(s), and so forth. Hybrid engine 34 applies various weights (e.g., user specified weights) to the values for the rule-based recommendation and the collaborative filtering recommendation(s) and determines the recommended tiers by applying one or more operations to these weighted values (e.g., by averaging these weighted values), as shown in the below Table 7.

TABLE 7

Recommended Tier = F{w$_1$(Collaborative filtering recommendation), w$_2$(Rule-based recommendation)}

As shown in the above Table 7, hybrid engine 34 determines the recommended tier by applying a mathematical operation or function ("F") to weighted values of the collaborative filtering recommendation and the rule-based recommendation. There are various types of functions F, including, e.g., an averaging function. Hybrid engine 34 generates recommendation 38, which includes information indicative of the recommended tier. Hybrid engine 34 transmits recommendation 38 to client device 40 to enable viewing of recommendation 38 by user 42. In a variation, client device 40 may be a same client device as one of client devices 12, 16 and user 42 may be a same user as users 14, 18.

After a user has been enrolled in system 26, the user has control to change account security settings, and may opt-out at a later point, if desired. System 26 performs a security audit of a user's account at predefined time intervals, e.g., every 30 days. At that time, system 26 reviews its recommendation, the security level chosen by the customer, and any security breaches which happened to the account. Based on this review, system 26 analyzes its recommendation and improves its recommendation engine for future customers by identifying instances where the recommended security tier was not high enough to prevent a breach. System 26 identifies the circumstances under which the security breach took place and adjusts its rules in accordance with this breach. System 26 updates its recommendation matrices at predetermined time intervals (e.g., nightly) with the adjusted rules.

Networked environment 10 also includes data repository 29 for storage of additional information, e.g., that is used in generating a customer profile. Data repository 29 includes information specifying an amount and types of trades a user makes, when a user logs into his/her account, information specifying whether second users are permitted to access an account, and so forth. System 26 accesses this information in generating a customer profile for storage in data repository 28.

In a variation, data repositories 28 and 36 are combined into a single data repository. In another variation, data repositories 28, 29 and 36 are combined into a single data repository, either internal to or external to system 26. In still another variation, networked system 10 includes one or more other systems, e.g., for generating and accessing user accounts, for executing trades and for performing other account functionality and operations.

Figure 2:
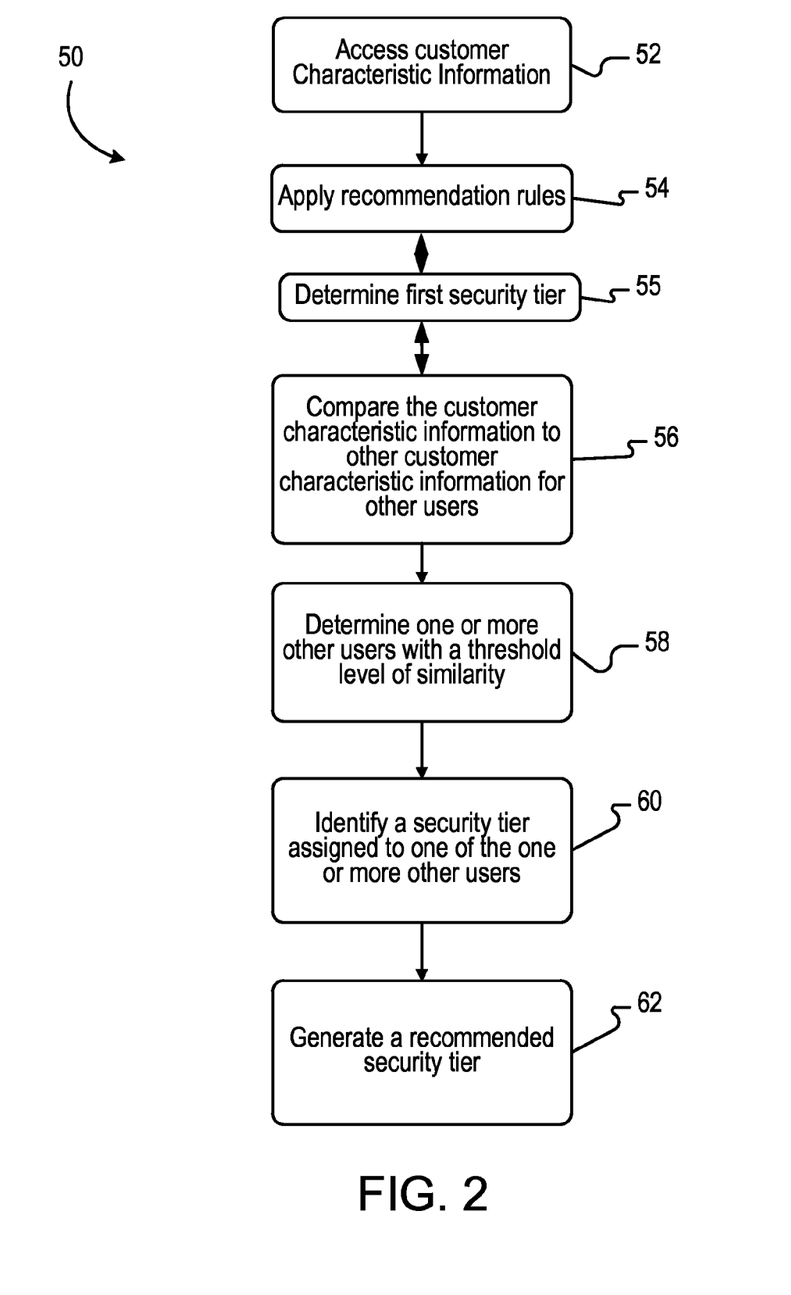
FIGS. 2-4 are flow charts of a process for generating a recommendation for a security tier.

Referring to FIG. 2, system 26 implements process 50 in generating a recommended tier. In operation, system 26 accesses (52) customer characteristic information for a user. This information is accessed from a data repository, e.g., data repository 28. This information is also formatted to be compliant with various rule conditions of recommendation rules (e.g., recommendation matrices). System 26 applies (54) one or more recommendation rules to the customer characteristic information. System 26 determines (55) a first security tier, e.g., the rule-based recommendation. To generate the collaborative-filtering recommendation, system 26 compares (56) the customer characteristic information to other customer characteristic information for other users, e.g., by comparing the customer characteristic information to the customer matrices.

System 26 determines (58), based on comparing, one or more other users with a threshold level of similarity to the user for which the customer characteristic information is accessed. System 26 identifies (60) a security tier assigned to one of the one or more other users, e.g., the collaborative-filtering recommendation. System 26 generates (62) information indicative of a recommended security tier, based on the identified security tier (e.g., the collaborative-filtering recommendation) and the determined security tier (e.g., the rule-based recommendation). In a variation, at least some of the actions of process 50 are implemented by hybrid engine 34.

Figure 3:
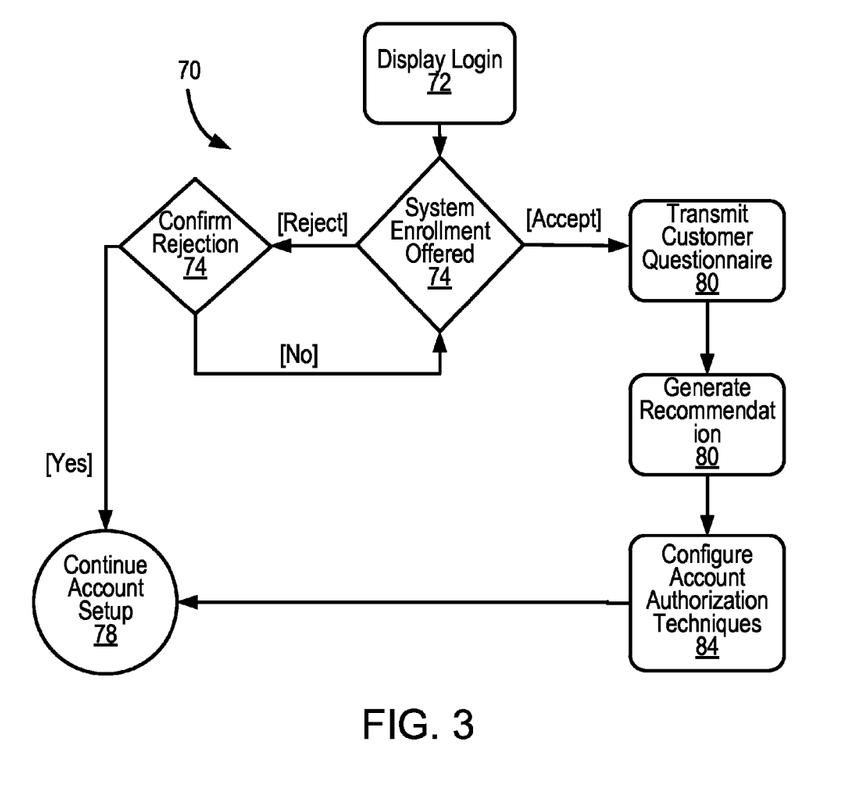

Referring to FIG. 3, system 26 implements process 70 in enrolling an existing user in the information security application that recommends a tier. In operation, system 26 displays (72) a login display to the user. System 26 prompts (74) a user for enrollment in the information security application. When the user accepts to enroll, system 26 transmits (80) an enrollment questionnaire to the user, e.g., by transmitting to a client device of the user the enrollment questionnaire or information indicative of the enrollment questionnaire. Based on one or more answers to questions in the enrollment questionnaire and based on other customer characteristics information (that is previously stored or that is derived by system 26 from previously stored information), system 26 generates (82) a recommendation. The user either selects the recommended tier or selects a different security tier. Based on the selected tier, system 26 configures (84) appropriate account authorization techniques, e.g., by associating the user's account with information specifying which authorization techniques are required for the selected tier. Tier 1 requires user name and password authentication. When the user selects tier 1, system 26 associates the user's profile with information specifying that user name and password is required for authentication. Tier 4 requires user name and password authentication, secondary factor authentication (e.g., entering an identifying code that is sent to a mobile device of the user), and a personal identification number. When the user selects tier 4, system 26 associates the user's profile with information specifying that this type of authentication information is required. Following configuration, system 26 continues (78) with account setup, e.g., by enabling the user to select other options to setup or configure the account.

When the user declines enrollment in the information security application, system 26 prompts (76) the user to confirm that he/she wants to decline. When the user indicates that he/she does not want to decline, system 26 performs action 80 and so on. When the user indicates that he/she does want to decline, system 26 continues (78) with account setup. In variation, at least a portion of the actions of process 70 are performed by one or more systems (e.g., an account creation system) that are external to system 26 and are configured for communication with system 26.

Figure 4:
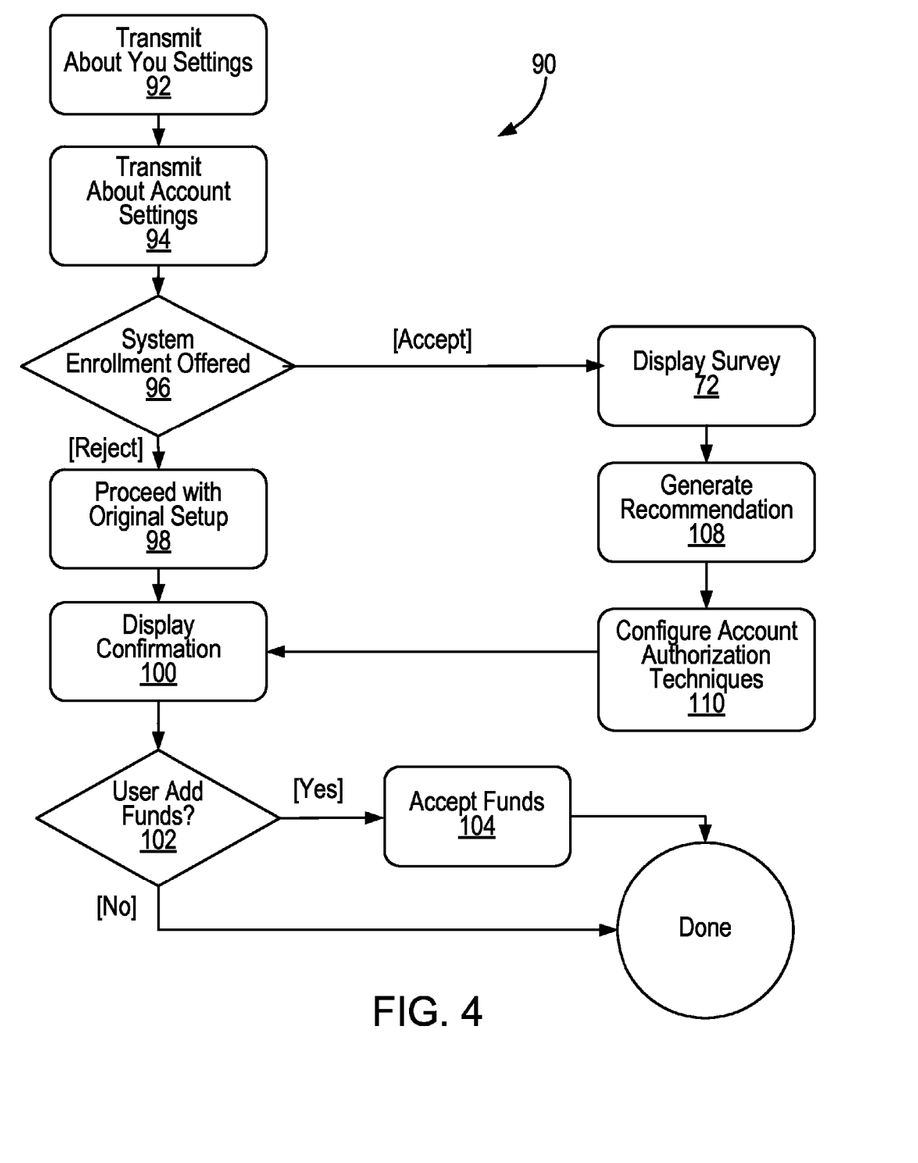

Referring to FIG. 4, system 26 implements process 90 in enrolling a new user in the security information application, e.g., when the user is setting-up an account. In operation, system 26 transmits (92), to a client device of the new user, a webpage that enables the user to input information about the user and various other settings. System 26 also transmits (94), to the client device, a webpage that enables the user to enter account settings. System 26 prompts (96) the user to enroll in the security information application. When the user accepts the invitation to enroll, system 26 displays (106) the enrollment questionnaire, e.g., by sending information indicative of the enrollment questionnaire to the client device. Using responses to the questions in the enrollment questionnaire, system 26 generates (108) a recommended tier. The user either selects the recommended tier or selects a different security tier. Based on the selected tier, system 26 configures (110) appropriate account authorization techniques, e.g., by associating the user's account with information specifying which authorization techniques are required for the selected tier.

System 26 displays (100) a confirmation of enrollment in the security information program, e.g., by transmitting to the client device confirmation information. System 26 prompts (102) the user to add funds to the account. When the user chooses to add funds, system 26 accepts (104) the funds, e.g., via an electronic transfer from one institution to an institution associated with system 26 or with another system. When the user declines to add funds, process 90 terminates. When the user declines to enroll in the security information application, system 26 proceeds (98) with the account set-up and proceeds with actions 100, 102, and 104, if appropriate, as shown in FIG. 4.

In variation, at least a portion of the actions of process 90 are performed by one or more systems (e.g., an account creation system) that are external to system 26 and are configured for communication with system 26. In this variation, after action 100, system 26 sends an indication to another system to proceed with process 90. This other system is a system for opening a new account. This other system interfaces with system 26 to provide for enrollment in the security information application.

Figure 5:
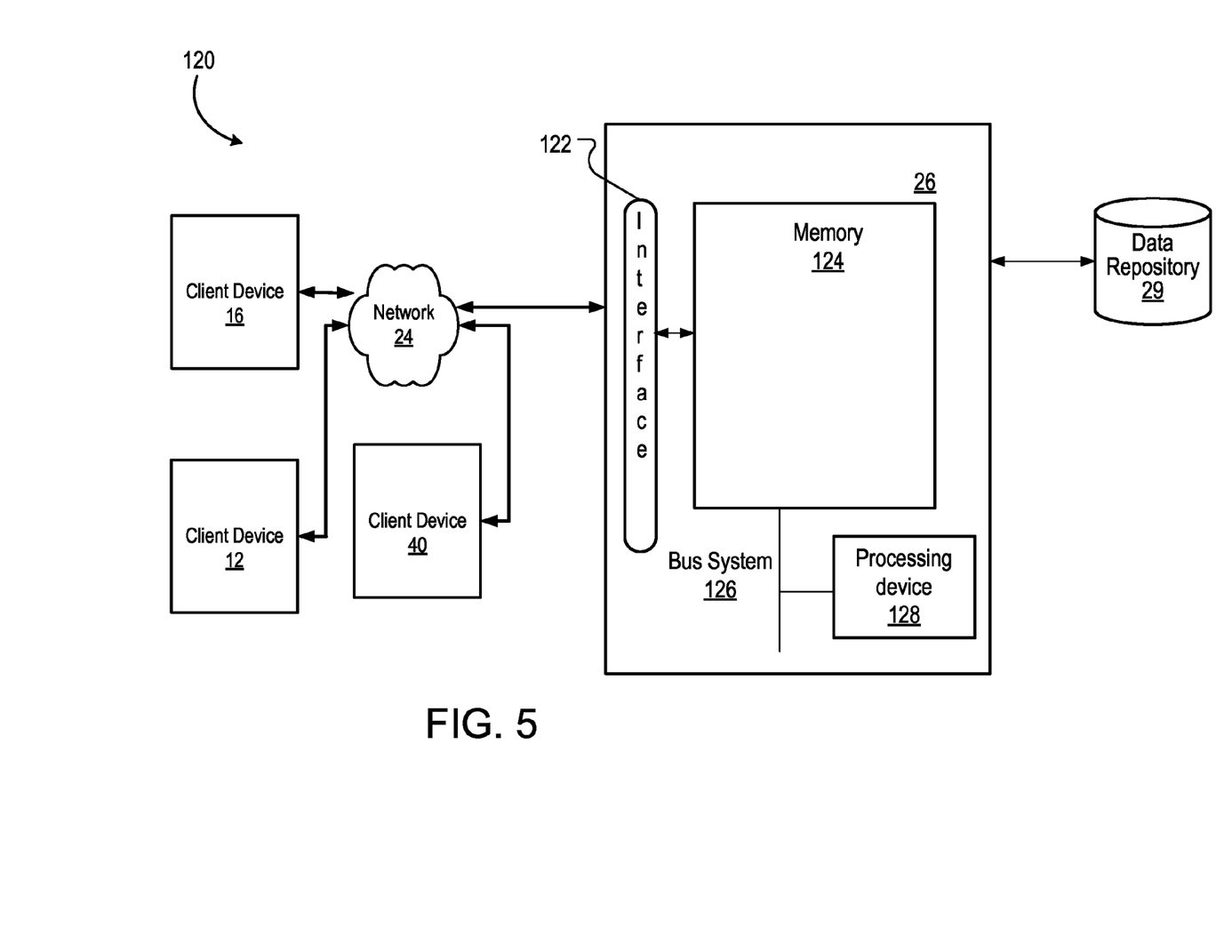
FIG. 5 is a block diagram of components of a system for generating a recommendation for a security tier.

Referring to FIG. 5, client devices 12, 16, 40 can each be any sort of computing device capable of taking input from a user and communicating over network 14 with system and/or with other client devices. Client devices 12, 16, 40 can each be a mobile device, a desktop computer, a laptop, a cell phone, a personal digital assistant ("PDA"), a server, an embedded computing system, a mobile device and so forth.

System 26 can be any of a variety of computing devices capable of receiving information, such as a server, a distributed computing system, a desktop computer, a laptop, a cell phone, a rack-mounted server, and so forth. System 26 may be a single server or a group of servers that are at a same location or at different locations.

System 26 can receive information from each of client devices 12, 16, 40 via interface 122, which is any type of interface capable of receiving information over a network, such as an Ethernet interface, a wireless networking interface, a fiber-optic networking interface, a modem, and so forth. System 26 also includes processing device 128 and memory 124. A bus system 126, including, for example, a data bus and a motherboard, can be used to establish and to control data communication between the components of system 26. Processing device 128 may include one or more microprocessors. Generally, processing device 128 may include any appropriate processor and/or logic that is capable of receiving and storing data, and of communicating over a network (not shown). Memory 124 can include a hard drive and a random access memory storage device, such as a dynamic random access memory, machine-readable media, or other types of non-transitory machine-readable hardware storage devices. Memory 124 and processing device 128 may execute one or more software applications, e.g., engines 30, 34. Memory 124 includes data repositories 28, 36.

Example Use Cases

System 26 transmits to a client device information that presents an existing user with an option to enroll in an information security program (e.g., that is implemented via system 26), e.g., when the user logs into his/her account. If the customer accepts, system 26 transmits to a client device of the customer an account security page, where the customer completes a question before he/she is presented with a security recommendation. System 26 determines the customer characteristics required for generating a recommendation by analyzing an account history of the customer. System 26 presents to the customer those characteristics (e.g., such as technical knowledge) that cannot be determined from the account history. System 26 presents to the customer the recommendation tier. The user is able to select a desired security level, discarding the recommendation, if desired. If the customer declines enrollment in the information security program, the customer is brought to an account homepage, and no account security settings will be modified.

For example, Mark is an international businessman who has worked in the financial institution industry for over 25 years. He is close to retirement, and checks his brokerage account and 401k daily. He's concerned that his account is compromised, as he is constantly traveling to new locations and using public Wi-Fi where available.

One day after logging into his accounts, Mark is presented with a pop-up, asking him if he would like to enroll in the information security program. After reading the brief description, Mark realizes that this is the exact enchantment to account security he was looking for. Upon clicking the "Accept" button, Mark is presented with a simple 1-question form, as shown below:

1. On a scale from 1 to 10, rate your level of technical expertise.

System 26 only needs Mark to answer one question, as it already has a user profile that has been generated for Mark and updated as his accounts have grown. Mark has been using his account for over 10 years, and during that time system 26 has tracked certain metrics regarding his account access. Using these metrics, system 26 determines that Mark accesses his account daily, that he logs in from a new location about twice a month, and his account access is split across 7 devices. After reviewing Mark's user profile, system 26 recommends that he use security tier 3. Mark reads over the offers, and agrees that tier 3 is best. He continues with the setup process and is back to managing his accounts in under 5 minutes.

A new customer is presented the opportunity to enroll in the information security program during account set-up. After completing portion of a webpage pertaining to "your information" and "account information," system 26 transmits to a client device of the new user information for a webpage titled "Account Security." This webpage invites the user to enroll in the information security program. If the user accepts, system 26 transmits to the client device an enrollment questionnaire (e.g., enrollment questionnaire 44a).

Once the user has completed the questionnaire, system 26 transmits to a client device of the user a security tier selection webpage, with the recommendation highlighted. The user selects an account security level, accepting or discarding the recommendation, as desired. Once the account security setup is completed, the customer is transferred to the next step in the account creation process.

For example, Steve is a recent college graduate who just started his first job in the corporate world. He does not have any investing experience, but he's very tech-savvy and knows that an entity (associated with system 26) has the best online research tools for investing. He realizes that he needs to start investing to have a sound financial future, and heads a website of the entity to create his first brokerage account.

After finishing the first two steps of the account creation process ("About you" & "About your account"), he is presented with the option to enroll in information security system. He's intrigued, and accepts the pop-up's offer to enroll. He completes a brief questionnaire, as listed shown above in Table 1.

Once Steve is happy with his answers, he clicks the submit button, and system 26 calculates a recommended tier. System 26 sends to Steve's device a webpage that displays the recommended tier. Steve sees that tier 1 is recommended, which features a simple username/password authentication method. System 26 has analyzed his user profile based on his answers to the profile questions and calculated that tier 1 should provide adequate account protection. After choosing his desired level of account security, Steve continues with the account creation process.

Embodiments can be implemented in digital electronic circuitry, or in computer hardware, firmware, software, or in combinations thereof. Apparatus can be implemented in a computer program product tangibly embodied or stored in a machine-readable storage device for execution by a programmable processor; and method actions can be performed by a programmable processor executing a program of instructions to perform functions by operating on input data and generating output. The techniques described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description and the claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments have been described. Nevertheless, it will be understood that various modifications may be made without departing from the spirit and scope of the claims and the examples of the techniques described herein.

What is claimed is:

1. A computer-implemented method comprises:
  receiving, by one or more computer systems, customer characteristic information for a user;
  applying, by the one or more computer systems, one or more recommendation rules to the customer characteristic information to determine a security tier indicative of a number of authentication sources required for accessing data associated with the user;
  comparing, by the one or more computer systems, the customer characteristic information to one or more other users with a threshold level of similarity to the user for which the customer characteristic information is received;
  identifying, by the one or more computer systems, another security tier indicative of another number of authentication sources required for accessing data associated with one of the one or more other users, the other security tier being assigned to the one of the one or more other users; and
  generating information indicative of a recommended security tier indicating a suggested number of authentication sources to require for accessing the data associated with the user, based on the determined security tier and the other identified security tier.

2. The computer-implemented method of claim 1, further comprising:
accessing one or more customer matrixes, with a customer matrix comprising at least a portion of the other customer characteristic information for one or more of the other users;
applying a classification algorithm to the one or more customer matrixes; and
determining a classification for the user, with the classification comprising customer characteristics of one or more other users.

3. The computer-implemented method of claim 2, further comprising:
when at least two other users are assigned to the classification as the user, averaging values of security tiers assigned to other users in the classification.

4. The computer-implemented method of claim 1, further comprising:
averaging a value of the other identified security tier and a value of the determined security tier, with the recommended security tier being the averaged values of the other identified security tier and the determined security tier.

5. The computer-implemented method of claim 4, further comprising:
applying by the one or more computer systems a first weight to the other identified security tier and a second weight to the determined security tier;
where averaging comprises averaging a weighted value of the other identified security tier and a weighted value of the determined security tier.

6. The computer-implemented method of claim 1, wherein the security tier determined is a first recommended security tier, and wherein the method further comprises:
for each type of customer characteristic included in the accessed customer characteristic information, accessing a mapping of one or more values for the type of customer characteristic to one or more security tiers; and
determining, based on the mapping, a security tier for the type of customer characteristic; and
determining, based on the security tiers for the types of customer characteristics included in the accessed customer characteristic information, the first recommended security tier.

7. The computer-implemented method of claim 6, further comprising:
averaging values of the security tiers for the types of customer characteristics included in the accessed customer characteristic information to determine the first recommended security tier.

8. A computer program product tangibly stored on a computer readable hardware storage device, the computer program product comprising instructions for causing one or more processing devices to perform operations comprising:
receiving customer characteristic information for a user;
applying one or more recommendation rules to the customer characteristic information to determine a security tier indicative of a number of authentication sources required for accessing data associated with the user;
comparing the customer characteristic information to one or more other users with a threshold level of similarity to the user for which the customer characteristic information is received;
identifying another security tier indicative of another number of authentication sources required for accessing data associated with one of the one or more other users, the other security tier being assigned to the one of the one or more other users; and
generating information indicative of a recommended security tier indicating a suggested number of authentication sources to require for accessing the data associated with the user, based on the determined security tier and the other identified security tier.

9. The computer program product of claim 8, wherein the operations further comprise:
accessing one or more customer matrixes, with a customer matrix comprising at least a portion of the other customer characteristic information for one or more of the other users;
applying a classification algorithm to the one or more customer matrixes; and
determining a classification for the user, with the classification comprising customer characteristics of one or more other users.

10. The computer program product of claim 9, wherein the operations further comprise:
when at least two other users are assigned to the classification as the user, averaging values of security tiers assigned to other users in the classification.

11. The computer program product of claim 8, wherein the operations further comprise:
averaging a value of the other identified security tier and a value of the determined security tier, with the recommended security tier being the averaged values of the other identified security tier and the determined security tier.

12. The computer program product of claim 11, wherein the operations further comprise:
applying by the one or more computer systems a first weight to the other identified security tier and a second weight to the determined security tier;
where averaging comprises averaging a weighted value of the other identified security tier and a weighted value of the determined security tier.

13. The computer program product of claim 8, wherein the security tier determined is a first recommended security tier, and wherein the operations further comprise:
for each type of customer characteristic included in the accessed customer characteristic information, accessing a mapping of one or more values for the type of customer characteristic to one or more security tiers; and
determining, based on the mapping, a security tier for the type of customer characteristic; and
determining, based on the security tiers for the types of customer characteristics included in the accessed customer characteristic information, the first recommended security tier.

14. The computer program product of claim 13, wherein the operations further comprise:
averaging values of the security tiers for the types of customer characteristics included in the accessed customer characteristic information to determine the first recommended security tier.

15. A system comprising:
one or more processing devices; and
a computer program product tangibly stored on a computer readable hardware storage device, the computer program product comprising instructions for causing the one or more processing devices to perform operations comprising:
receiving customer characteristic information for a user;
applying one or more recommendation rules to the customer characteristic information to determine a security tier indicative of a number of authentication sources required for accessing data associated with the user;
comparing the customer characteristic information to one or more other users with a threshold level of similarity to the user for which the customer characteristic information is received;
identifying another security tier indicative of another number of authentication sources required for accessing data associated with one of the one or more other users, the other security tier being assigned to the one of the one or more other users; and
generating information indicative of a recommended security tier indicating a suggested number of authentication sources to require for accessing the data associated with the user, based on the determined security tier and the other identified security tier.

16. The system of claim 15, wherein the operations further comprise:
accessing one or more customer matrixes, with a customer matrix comprising at least a portion of the other customer characteristic information for one or more of the other users;
applying a classification algorithm to the one or more customer matrixes; and
determining a classification for the user, with the classification comprising customer characteristics of one or more other users.

17. The system of claim 16, wherein the operations further comprise:
when at least two other users are assigned to the classification as the user, averaging values of security tiers assigned to other users in the classification.

18. The system of claim 15, wherein the operations further comprise:
averaging a value of the other identified security tier and a value of the determined security tier, with the recommended security tier being the averaged values of the other identified security tier and the determined security tier.

19. The system of claim 18, wherein the operations further comprise: applying by the one or more computer systems a first weight to the other identified security tier and a second weight to the determined security tier;
where averaging comprises averaging a weighted value of the other identified security tier and a weighted value of the determined security tier.

20. The system of claim 15, wherein the security tier determined is a first recommended security tier, and wherein the operations further comprise:
for each type of customer characteristic included in the accessed customer characteristic information, accessing a mapping of one or more values for the type of customer characteristic to one or more security tiers; and
determining, based on the mapping, a security tier for the type of customer characteristic; and
determining, based on the security tiers for the types of customer characteristics included in the accessed customer characteristic information, the first recommended security tier.

21. The system of claim 20, wherein the operations further comprise:
averaging values of the security tiers for the types of customer characteristics included in the accessed customer characteristic information to determine the first recommended security tier.

* * * * *